United States Patent [19]

Schmid et al.

[11] Patent Number: 4,826,927
[45] Date of Patent: May 2, 1989

[54] MIXTURES CONTAINING POLYMIDES ALKENYPHENOLS AND EITHER EPOXIDE GROUP-FREE ADDUCTS OR ANOTHER POLYIMIDE

[75] Inventors: Rolf Schmid, Schwarzenburg; Werner Stauffer, Fribourg; Abdul-Cader Zahir, Oberwil, all of Switzerland

[73] Assignee: Ciba-Geigy Corporation, Ardsley, N.Y.

[21] Appl. No.: 255

[22] Filed: Jan. 2, 1987

[30] Foreign Application Priority Data

Jan. 13, 1986 [CH] Switzerland .................. 105/86

[51] Int. Cl.⁴ .................. C08G 73/12; C08L 79/08
[52] U.S. Cl. .................. 525/422; 525/423; 525/426; 525/533
[58] Field of Search .................. 525/530, 422, 423, 426

[56] References Cited

U.S. PATENT DOCUMENTS

| | | | |
|---|---|---|---|
| 4,100,140 | 7/1978 | Zahir et al. | 525/502 |
| 4,127,615 | 11/1978 | Zahir et al. | 525/530 |
| 4,652,398 | 3/1987 | Goswami et al. | 525/423 |

FOREIGN PATENT DOCUMENTS 62-232475 10/1987 Japan .................. 525/422

*Primary Examiner*—John C. Bleutge
*Assistant Examiner*—Robert E. L. Sellers, II
*Attorney, Agent, or Firm*—Harry Falber

[57] ABSTRACT

Storage-stable heat-curable mixtures are described which contain
(A) a polyimide which contains in the molecule at least two radicals of formula I

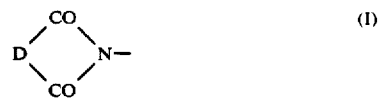

wherein D is a divalent radical with a C=C double bond,
(B) an alkenylphenol,
(C) an epoxide group-free adduct of an epoxy resin with excess alkenylphenol or
(D) a polyimide which is soluble in organic solvents or a mixture of (C) and (D).

These mixtures are employed for example as laminating resins or electro-resins, as adhesives or adhesive films for application at high temperatures, or for the preparation of coatings.

20 Claims, No Drawings

MIXTURES CONTAINING POLYMIDES ALKENYPHENOLS AND EITHER EPOXIDE GROUP-FREE ADDUCTS OR ANOTHER POLYIMIDE

The present invention relates to storage-stable heat-curable (crosslinkable) mixtures and to the use thereof, in particular as laminating resins or electro-resins, as adhesives or adhesive films for application at high temperatures, or for the preparation of coatings.

U.S. Pat. No. 4,100,140 discloses storage-stable heat-curable mixtures comprising polyimides with C=C double bonds, in particular bismaleimides, alkenylphenols and/or alkenylphenol ethers and, optionally, polymerisation catalysts, which mixtures are used in particular as casting resins. U.S. Pat. 4,127,615 describes further storage-stable heat-curable mixtures which, in addition to containing polyimides with C=C double bonds, alkenylphenols and/or alkenylphenyl ethers, also contain an epoxy resin and, optionally, a curing catalyst, which epoxy resin may also be substituted by allyl groups. These mixtures are also preferably used as casting resins.

The present invention relates to novel storage-stable heat-curable mixtures containing (A) a polyimide which contains in the molecule at least two radicals of formula I

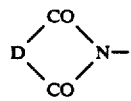
(I)

wherein D is a divalent radical with a C=C double bond, (B) an alkenylphenol, (C) an epoxide group-free adduct of an epoxy resin with excess alkenylphenol or (D) a polyimide which is soluble in organic solvents or a mixture of (C) and (D).

In principle, any known compounds may be employed as polyimides (A) containing groups of formula I. D is preferably a radical of the formula —CR=C-R'—,

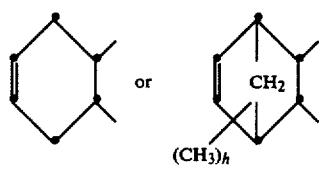

wherein h is 0 or 1 and each of R and R' independently of the other is a hydrogen or chlorine atom or a methyl group. Particularly suitable polyimides are maleimides of formula II

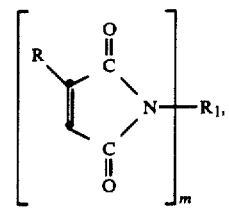
(II)

wherein m is 2 or 3, R is a hydrogen atom or a methyl group and $R_1$ is an m-valent organic radical containing 2 to 30 carbon atoms.

R is preferably a hydrogen atom.

Examples of suitable organic radicals, $R_1$ when m is 2 are: —$C_pH_{2p}$—, wherein p is 2 to 20, preferably —$(CH_2)_p$—, wherein p is 2 to 12, —$CH_2CH_2SCH_2CH_2$—, $C_6$-$C_{10}$ arylene, xylylene, cyclopentylene, cyclohexylene, 1,4-bis(methylene)cyclohexylene, the radical of bicyclohexylmethane, or radicals of the formula III or IV

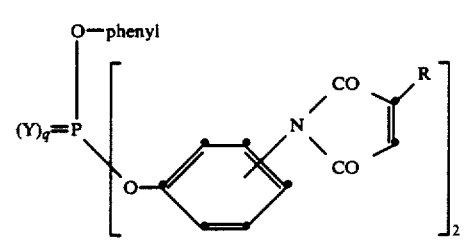
(III)

or

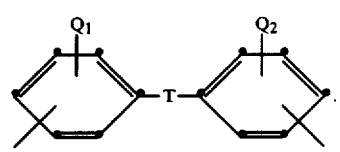
(IV)

If m is 3, then $R_1$ is e.g. a radical of formula V

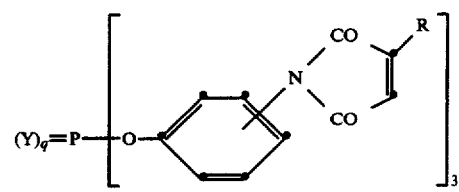
(V)

In the above formulae III to V, T is the direct bond, methylene, 2,2-propylidene, —CO—, —S—, —$SO_2$—, —P=O($Q_3$)—, —$NQ_3$— ($Q_3$=$C_1$-$C_4$alkyl), —N=N—, —CONH—, —COO—, —N$Q_3$—CO—A—CO—N$Q_3$—, —O—CO—A—CO—O—,

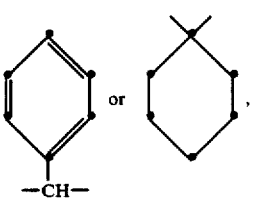

q is 0 is 1,
Y is O or S, $Q_1$ and $Q_2$ are each independently of the other a halogen atom, preferably chlorine or bromine, or are methyl or ethyl and, most preferably, a hydrogen atom.

A is a direct bond, —$C_tH_{2t}$—, in which t is 1 to 12, $C_6$-$C_{10}$arylene, xylylene, cyclopentylene or cyclohexylene, and R is as defined above.

Typical examples of maleimides of formula II which the mixtures of this invention may contain are:
N,N'-ethylene-bismaleimide,
N,N'-hexamethylene-bismaleimide,
N,N'-m-phenylene bismaleimide,
N,N'-4,4'-diphenylmethane-bismaleimide,
N,N'-4,4'-3,3'-dichlorodiphenylmethane-bismaleimide,
N,N'-4,4'-diphenyl ether-bismaleimide,
N,N'-4,4'-diphenylsulfone-bismaleimide,
N,N'-m-xylylene-bismaleimide,
N,N'-p-xylylene-bismaleimide,
N,N'-4,4'-2,2-diphenylpropane-bismaleimide,
the N,N'-bismaleimide of 4,4'-diaminotriphenylphosphate,
the N,N'-bismaleimide of 4,4'-diaminotriphenylthiophosphate,
the N,N',N''-trismaleimide of tris(4-aminophenyl)phosphate,
the N,N',N''-trismaleimide of tris(4-aminophenyl)phosphite, and
the N,N',N''-trismaleimide of tris(4-aminophenyl)thiophosphate.

Preferred compounds of formula II are those wherein m is 2, R is a hydrogen atom and $R_1$ is —$(CH_2)_p$—, in which p is 2 to 12, or is m- or p-phenylene, m- or p-xylylene, 1,4-cyclohexylene, 1,4-bis(methylene)cyclohexylene, the radical of 4,4'-biscyclohexylmethane and, in particular, a radical of formula IV which is attached in the 4,4'-position, wherein each of $Q_1$ and $Q_2$ is a hydrogen atom and T is —O—, —$CH_2$— or —$SO_2$—. The most preferred compound of formula II is N,N',4,4'-diphenylmethane-bismaleimide.

In accordance with the present invention, mixtures of various polyimides containing groups of formula I may also be employed.

In accordance with the invention, preferred alkenylphenols are allylphenols or methallylphenols. Both mononuclear and polynuclear, preferably binuclear, alkenylphenols may be employed. Preferably, at least one nucleus contains both an alkenyl group and a phenolic OH group.

It is known to prepare alkenylphenols by thermal rearrangement (Claisen) of the alkenyl ethers of phenols, e.g. of the phenylallyl ether. These alkenyl ethers are likewise obtained by known methods, i.e. by reacting phenols and e.g. allyl chloride in the presence of alkali metal hydroxide and solvents.

A class of preferred components (B) comprises alkenyl-substituted phenols and polyols. Typical examples are:

compounds of formula VI

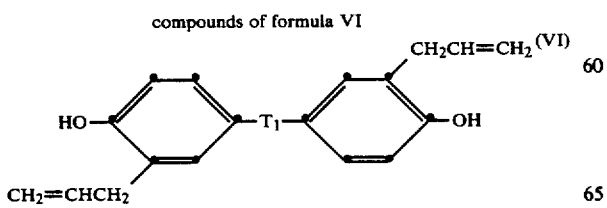

wherein $T_1$ is a direct bond, methylene, 2,2-propylidene, —O—, —S—, —SO— or —$SO_2$—. Examples of such compounds are: o,o'-diallyl-bisphenol A, bis(4-hydroxy-3-allyl)biphenyl, bis(4-hydroxy-3-allylphenyl)methane and 2,2-bis(4-hydroxy-3-allylphenyl)propane;

propenyl-substituted phenols of formula VII

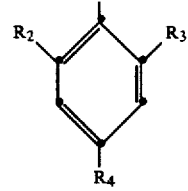

wherein $R_2$, $R_3$ and $R_4$ are each independently a hydrogen atom or an allyl or propenyl group, with the proviso that at least one of $R_2$ to $R_4$ is a propenyl group;

compounds of formula VIII

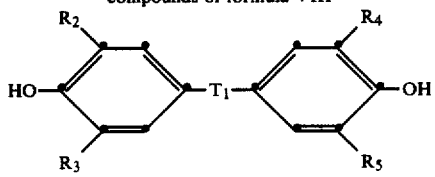

wherein $R_2$, $R_3$, $R_4$ and $R_5$ are each independently a hydrogen atom or an allyl or propenyl group, with the proviso that at least one of $R_2$ to $R_5$ is a propenyl group, and $T_1$ is as defined for formula VI; and compounds of formula IX

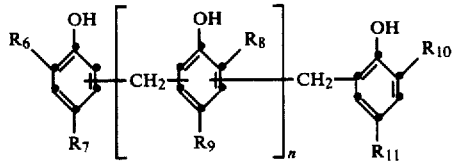

wherein $R_6$, $R_7$, $R_8$, $R_9$, $R_{10}$ and $R_{11}$ are each independently a hydrogen atom, $C_1$-$C_4$alkyl, allyl or propenyl, with the proviso that at least one of $R_6$ to $R_{11}$ is a propenyl group, and n is a value from 0 to 10. Compounds of formula VIII are preferred in which each of $R_2$ and $R_4$ is a propenyl group and each of $R_3$ and $R_5$ is a hydrogen atom and $T_1$ is methylene, 2,2-propylidene or —O—.

It is also possible to use mixtures of isomers of propenyl- and allyl-substituted mono- or polyhydric phenols. Among the mixtures of isomers it is preferred to use mixtures of propenyl- and allyl-substituted phenols of formula VIII, preferably those which are obtained by partial isomerisation of allyl-substituted phenols of formula VIIIa

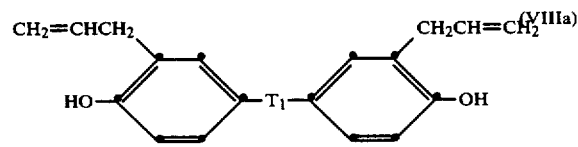

wherein $T_1$ is methylene, 2,2-propylidene or —O—. Such alkenyl-substituted phenols and polyols are disclosed e.g. in U.S. Pat. Nos. 4,100,140 and 4,371,719.

Particularly preferred components (B) are compounds of formula VI wherein $T_1$ is 2,2-propylidene or, preferably, methylene.

For the preparation of the adducts (C), in principle, any epoxy resins may be employed. It is preferred to use epoxy resins containing on average more than one group of formula X

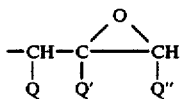

wherein each of Q and Q" is a hydrogen atom and Q' is a hydrogen atom or a methyl group or Q and Q" together are —CH$_2$CH$_2$— or —CH$_2$CH$_2$CH$_2$— and Q' is a hydrogen atom, which group of formula II is attached to a hetero atom, e.g. a sulfur atom and, preferably, to an oxygen or nitrogen atom.

Typical examples of such resins are polyglycidyl esters and poly($\beta$-methylglycidyl) esters which are derived from aliphatic, cycloaliphatic or aromatic polycarboxylic acids. Examples of suitable polycarboxylic acids are: succinic acid, glutaric acid, adipic acid, pimelic acid, suberic acid, azelaic acid, sebacic acid, dimerised or trimerised linoleic acid, tetrahydrophthalic acid, 4-methyltetrahydrophthalic acid, hexahydrophthalic acid, 4-methylhexahydrophthalic acid, phthalic acid, isophthalic acid and terephthalic acid.

Further examples are polyglycidyl ethers and poly($\beta$-methylglycidyl) ethers which are obtained by reacting a compound containing at least two alcoholic and/or phenolic hydroxyl groups per molecule with epichlorohydrin or with allyl chloride, and then epoxidising the reaction product with a peracid.

Examples of suitable polyols are: ethylene glycol, diethylene glycol, poly(oxyethylene) glycols, propane-1,2-diol, poly(oxypropylene) glycols, propane-1,3-diol, butane-1,4-diol, poly(oxytetramethylene) glycols, pentane-1,5-diol, hexane-2,4,6-triol, glycerol, 1,1,1-trimethylolpropane, pentaerythritol and sorbitol; 1,3- and 1,4-cyclohexanediol, bis(4-hydroxycyclohexyl)methane, 2,2-bis(4-hydroxycyclohexyl)propane and 1,1-bis(hydroxymethyl)cyclohex-3-ene; N,N-bis(2-hydroxyethyl)aniline and 4,4'-bis(2-hydroxyethylamino)diphenylmethane; resorcinol, hydroquinone, bis(4-hydroxyphenyl)methane (bisphenol F), 2,2-bis(4-hydroxyphenyl)propane (bisphenol A), 2,2-bis(4-hydroxy-3,5-dibromophenyl)propane (tetrabromobisphenol A), 1,1,2,2-tetrakis(4-hydroxyphenyl)ethane, 4,4'-dihydroxybiphenyl, bis(4-hydroxyphenyl)sulfone, as well as novolaks of formaldehyde or acetaldehyde and phenol, chlorophenol or alkylphenols containing up to 9 carbon atoms in the alkyl moiety, preferably cresol and phenol novolaks.

Suitable poly(N-glycidyl) compounds are products obtained by dehydrochlorination of reaction products of epichlorohydrin and amines containing at least two active hydrogen atoms bonded to amino nitrogen atoms. Examples of suitable amines are: aniline, n-butylamine, bis(4-aminophenyl)methane, 1,3- and 1,4-xylylenediamine, 1,3- and 1,4-bis(aminomethyl)cyclohexane and bis(4-methylaminophenyl)methane. Further suitable compounds are: triglycidyl isocyanurate, N,N'-diglycidyl derivatives of cyclic alkylene ureas such as ethylene urea and 1,3-propylene urea, or hydantoins such as 5,5-dimethylhydantoin.

Examples of poly(S-glycidyl) compounds are the di-S-glycidyl derivatives of dithiols such as ethanol-1,2-dithiol and bis(4-mercaptomethylphenyl) ether.

Examples of epoxy resins containing one or more groups of the formula X, wherein Q and Q" together are a —CH$_2$CH$_2$— or —CH$_2$CH$_2$CH$_2$— group are bis(2,3-epoxycyclopentyl) ether, 2,3-epoxycyclopentyl glycidyl ether, 1,2-bis(2,3-epoxycyclopentyloxy)ethane, 3,4-epoxy-6-methylcyclohexylmethyl-3',4'-epoxy-6'-methylcyclohexane carboxylate and 2-(3,4-epoxy)cyclohexyl-5,5-spiro(3',4'-epoxy)cyclohexane dioxane.

Also eligible are epoxy resins in which the epoxy groups are attached to hetero atoms of different kind, or in which some or all of the epoxy groups are central, for example the N,N,O-triglycidyl derivative of 4-aminophenol, N-glycidyl-N'-(2-glycidyloxypropyl)-5,5-dimethylhydantoin, vinylcyclohexene dioxide, limonene dioxide and dicyclopentadiene dioxide.

For the adduct preparation it is particularly preferred to use diglycidyl ethers or advanced diglycidyl ethers of dihydric phenols, in particular diglycidyl ethers or advanced diglycidyl ethers of 2,2-bis(4-hydroxyphenyl)propane, of 2,2-bis(3,5-dibromo-4-hydroxyphenyl)propane, of bis(4-hydroxyphenyl)methane, of bis(4-hydroxycyclohexyl)methane or of 2,2-bis(4-hydroxycyclohexyl)propane; polyglycidyl ethers of novolaks, or tetraglycidylated 4,4'-diaminodiphenylmethane and alkenylphenols of formula VI or alkenyl ethers of phenols, e.g. the diallyl ether of bisphenol A. Very particularly preferred adducts are those of diglycidyl ethers or advanced diglycidyl ethers of bisphenol A or of tetrabromobisphenol A or, preferably, of bisphenol F with alkenylphenols of formula VI wherein $T_1$ is 2,2-propylidene or, preferably, methylene.

In accordance with the definition, for the adduct preparation the alkenylphenols or the alkenyl ethers of phenols are employed in excess to ensure that all epoxide groups are reacted. Depending on the intended use, larger or smaller excesses of alkenylphenols and/or alkenyl ethers of phenols are employed, thereby affording mixtures with higher or lower proportions of unreacted component (B). The ratio of epoxide equivalents to phenolic OH groups is conveniently in the range from 1:2 to 1:6, in particular from 1:3 to 1:4.

The adducts are prepared in a manner known per se in the melt or in an inert organic solvent and in the absence or presence of a catalyst. Examples of suitable inert solvents are unsubstituted or chlorinated aromatic hydrocarbons such as benzene, toluene and chlorobenzene; ketones such as acetone, methyl ethyl ketone and cyclohexanone; higher boiling alcohols such as butanols, isopropanol and 2-ethylhexanol. The reaction temperatures are generally in the range from 100° to 250° C., preferably from 120° to 180° C. The adduct formation is preferably effected in the melt. Acceptable catalysts are any compounds suitable for adduct formation, in particular alkali metal hydroxides, tertiary amines such as benzyldimethylamine, tris(dimethylaminomethyl)phenol, trimethylamine, triethylamine, octyldimethylamine, hexamethylenetetramine, as well as unsubstituted or substituted imidazoles such as imidazole, benzimidazole, 1-methylimidazole, 3-methylimidazole, 2-ethyl-4-methylimidazole, 2-phenylimidazole, 2-phenyl-4-methylimidazole and 1-(2,6-dichlorobenzoyl)-2-phenylimidazole. Tertiary amines, in particular benzyldimethylamine, and imidazoles, in particular 2-phenylimidazole, 3-methylimidazole and 2-ethyl-4-methylimidazole, are preferred catalysts.

When employing alkenyl ethers of phenols and epoxy resins, there takes place before the adduct formation an in situ Claisen rearrangement leading to the corresponding alkenylphenols. This method of preparing adducts is particularly advantageous because one reaction stage (i.e. that comprising the preparation of starting alkenylphenols from alkenyl ethers of phenols) can be dispensed with, as a consequence of which there is no troublesome alkenylphenol odour. The reaction is also less exothermic.

The components (D) may be homo- or copolyimides. In principle, any homo- or copolyimides which are soluble in organic solvents may be employed. The copolyimides may be static polyimides or block-copolyimides. Examples of particularly suitable components (D) are:

1. Polyimides containing phenylindan units such as are described in U.S. Pat. No. 3,856,752 and European patent publication No. 0 092 524 A2, which polyimides essentially consist of recurring structural units of formula XI

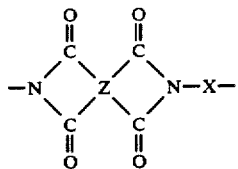

wherein the four carbonyl groups are linked to different carbon atoms and each pair of carbonyl groups is in the ortho- or para-position to the other, Z is a tetravalent radical which contains at least one aromatic ring and X is a divalent aromatic, aliphatic, alkylaromatic, cycloaliphatic or heterocyclic radical or a radical which contains O-, S-, N-, Si- or P-containing bridge members, with the proviso that (1) of the total number of recurring polyimide units (A) in 0 to 100 mol% of such units, Z is a phenylindan radical of the structural formula XII

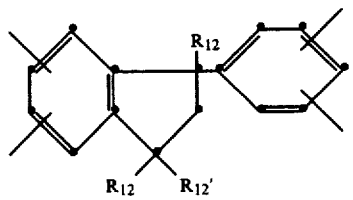

wherein $R_{12}$ is hydrogen or a $C_1$-$C_5$alkyl radical and $R_{12}'$ is a $C_1$-$C_5$alkyl radical, and (B) in 0 to 100 mol% of such units, X is a phenylindan radical of the structural formula XIII

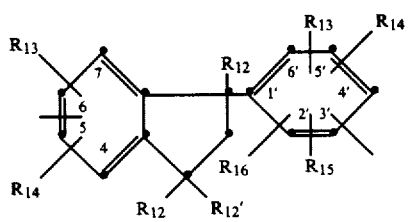

wherein $R_{12}$ is hydrogen or a $C_1$-$C_5$alkyl radical and $R_{12}'$ is a $C_1$-$C_5$alkyl radical and each of $R_{13}$, $R_{14}$, $R_{15}$ and $R_{16}$ independently is hydrogen, halogen, $C_1$-$C_4$alkoxy or a $C_1$-$C_4$alkyl radical and (2) of the total number of radicals Z and X at least 10 mol%, based on the individual components, are phenylindan radicals.

The degree of polymerisation (number of recurring structural units) is preferably at least 20 and may be 1000 or more. More preferably, the degree of polymerisation is in the range from 50 to 500, most preferably from 100 to 300.

$R_{12}$ and $R_{12}'$ as alkyl may be methyl, ethyl, propyl, isopropyl, butyl and pentyl. Particularly preferred meanings of $R_{12}$ are hydrogen or methyl and a particularly preferred meaning of $R_{12}'$ is methyl.

$R_{13}$, $R_{14}$, $R_{15}$ and $R_{16}$ as halogen are preferably chlorine or bromine. Examples of alkoxy radicals $R_{13}$, $R_{14}$, $R_{15}$ and $R_{16}$ are butoxy, propoxy, ethoxy and, preferably, methoxy; examples of alkyl radicals $R_{13}$, $R_{14}$, $R_{15}$ and $R_{16}$ are butyl, tert-butyl, propyl, isopropyl, ethyl and, preferably, methyl. Particularly preferred meanings of $R_{13}$, $R_{14}$, $R_{15}$ and $R_{16}$ are hydrogen, methyl or chlorine.

The phenylindandiamine component of the soluble polyimide may consist of any combination of the isomeric or substituted isomeric diamino radicals of the above formula XIII. For example, the phenylindandiamine component may comprise 0 to 100 mol% of 5-amino-1-(4'-aminophenyl)-1,3,3-trimethylindan radicals in combination with 100 to 0 mol% of 6-amino-1-(4'-aminophenyl)-1,3,3-trimethylindan radicals. Furthermore, one or both of these isomers may be substituted. Examples of such substituted diamino isomers are 5-amino-6-methyl-1-(3'-amino-4'-methylphenyl)-1,3,3-trimethylindan, 5-amino-1-(4'-amino-Ar',Ar'-dichlorophenyl)-Ar,Ar-dichloro-1,3,3-trimethylindan, 6-amino-1-(4'-amino-Ar',Ar'-dichlorophenyl)-Ar,Ar-dichloro-1,3,3-trimethylindan, 4-amino-6-methyl-1-(3'-amino-4'-methylphenyl)-1,3,3-trimethylindan and Ar-amino-1-(Ar'-amino-2',4'-dimethylphenyl)-1,3,3,4,6-pentamethylindan. Ar and Ar' in the above formulae show the indefinite position of the indicated substituents in the phenyl rings. The amino groups are preferably in the 7-position, in particular in the 5- and 6-positions, and in the 3'-position and, in particular, in the 4'-position. Examples of phenylindan dianhydride components containing a radical of formula XII are: 1-(3',4'-dicarboxyphenyl)-1,3,3-trimethylindan-5,6-dicarboxylic dianhydride, 1-(3',4'-dicarboxyphenyl)-1,3,3-trimethylindan-6,7-dicarboxylic dianhydride, 1-(3',4'-dicarboxyphenyl)-3-methylindan-5,6-dicarboxylic dianhydride and 1-(3',4'-dicarboxyphenyl)-3-methylindan-6,7-dicarboxylic dianhydride.

Z in formula XI as a non-phenylindan radical may be selected from the following groups: aromatic, aliphatic, cycloaliphatic and heterocyclic groups and combinations of aromatic and aliphatic groups. The groups may also be substituted. The groups Z may be characterised by the following structures:

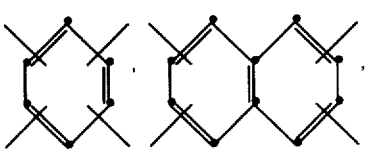

-continued

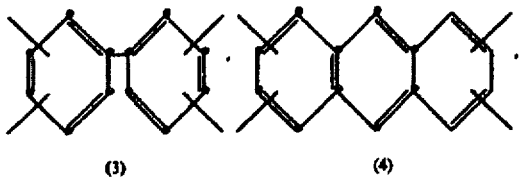

(3)            (4)

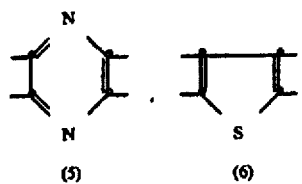

(5)            (6)

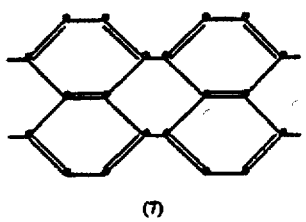

(7)

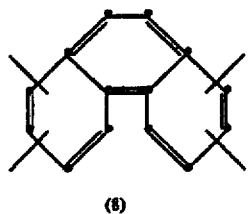

(8)

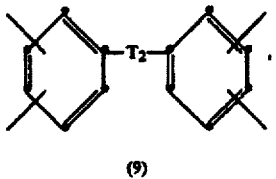

(9)

wherein T₂ is selected from the group consisting of

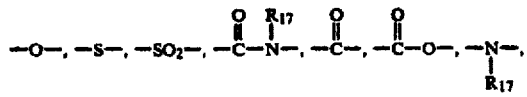

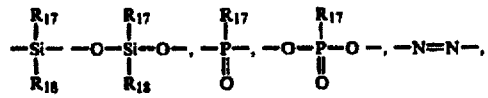

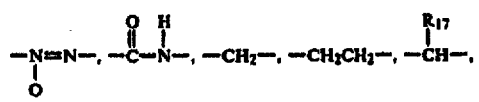

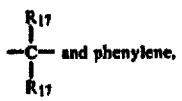 and phenylene, in which formulae $R_{17}$ and $R_{18}$ are alkyl preferably containing 1 to 6 carbon atoms, or aryl, preferably phenyl.

Particularly preferred meanings of Z are a radical of formula XII, the radical of pyromellitic dianhydride, a radical of formula XIV

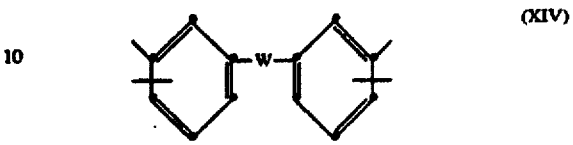

(XIV)

or a mixture of these radicals, W in formula XIV being the direct bond, —CH₂—, —O—, —SO₂— or —CO—.

The above-defined group X may e.g. be selected from $C_2$-$C_{12}$alkylene groups, cycloalkylene groups containing 4 to 6 ring carbon atoms; a xylylene group, arylene groups selected from ortho-, meta- or para-phenylene, tolylene, biphenylene, naphthylene or anthrylene; a substituted arylene group of formula XV

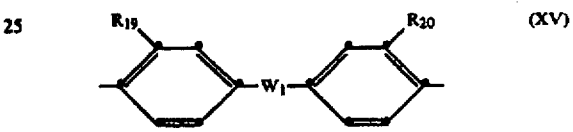

(XV)

wherein $W_1$ is a covalent bond, —CO—,

—SO₂—, linear or branched $C_1$-$C_3$-alkylene, $C_2$-$C_{12}$alkylidene, cycloalkylidene containing 5 or 6 ring carbon atoms, $C_6$-$C_{10}$arylene, preferably phenylene, or a group

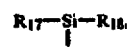

each of $R_{19}$ and $R_{20}$ independently of the other is hydrogen, halogen, preferably chlorine or bromine, $C_1$-$C_5$alkyl, preferably methyl, $C_1$-$C_5$alkoxy, preferably methoxy, or $C_6$-$C_{10}$aryl, preferably phenyl, and $R_{17}$ and $R_{18}$ are as defined above.

X may also be a group of formula XVI

(XVI)

wherein $R_{17}$ and $R_{18}$ are as defined above and A' is a divalent hydrocarbon radical, e.g. $C_1$-$C_{12}$alkylene, preferably $C_1$-$C_6$alkylene, cycloalkylene preferably containing 5 or 6 ring carbon atoms, or phenylene. x is preferably a value from 1 to 1000, in particular from 1 to 100, most preferably from 1 to 10. Diamines containing such groups X are described in U.S. Pat. No. 4 030 948.

X is preferably a group of formula XV and most preferably a group of formula XVa and XVb

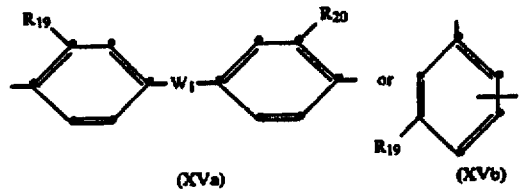

in which formulae $W_1$ is a covalent bond, methylene, ethylidene, 2,2-propylidene, cyclohexylidene, —S—, —O— or —SO$_2$— and each of $R_{19}$ and $R_{20}$ independently of the other is hydrogen, halogen, $C_1$–$C_5$alkyl or $C_1$–$C_5$alkoxy, with hydrogen or methyl being preferred.

A preferred subgroup of soluble polymides comprises those in which, in the structural units of formula XI, 0 to 100 mol% of the radicals Z are of the formula

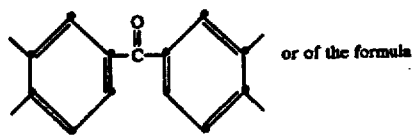 or of the formula

and 100 to 0 mol% of the radicals Z are a mixture of radicals of the formulae

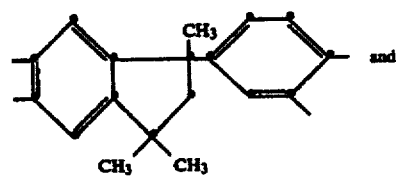 and

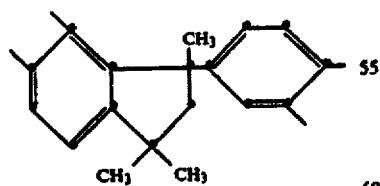

and 100 to 10 mol% of the radicals X are those of formula XIII wherein each of $R_{12}$, $R_{13}$, $R_{14}$, $R_{15}$ and $R_{16}$ independently is hydrogen or methyl and $R_{12}'$ is methyl, and 0 to 90 mol% of the radicals X are of the above formulae XVa or XVb.

Particularly preferred polyimides are those wherein, in the structural units of formula XI, X is

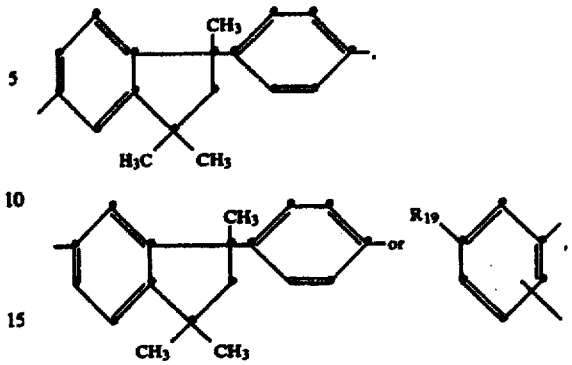

wherein $R_{19}$ is hydrogen or methyl, or a mixture thereof, and Z is

or a mixture thereof, the proportion of phenylindan units in the diamine components preferably being 70 to 100 mol%. The above polyimides generally have an inherent viscosity in the range from 0.10 to 1.50, in particular from 0.15 to 0.80 dl/g, measured at 25° C. in a 0.5% solution in N-methyl-2-pyrrolidone.

The average molecular weights $\overline{M}_n$ (number average) are conveniently in the range from 10000 to 40000, preferably from 15000 to 25000.

Homo- and copolyimides comprising at least one aromatic tetracarboxylic acid and at least one aromatic diamine, which homo- and copolyimides essentially consist of 5 to 100 mol% of at least one structural unit of formula XVII

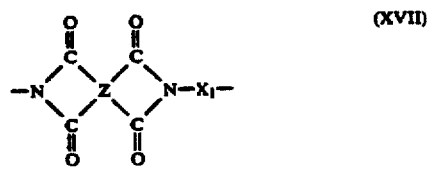

(XVII)

and 95 to 0 mol% of at least one structural unit of formula XVIII

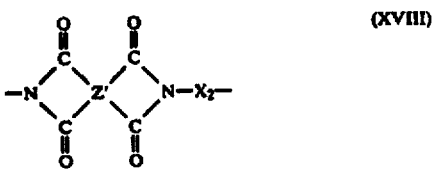

(XVIII)

in which formulae the four carbonyl groups are linked to different carbon atoms and each pair of carbonyl groups is in the ortho- or peri-position to the other, Z is as defined for formula XI, Z' has the same meaning as Z or is a tetravalent radical different from Z, $X_1$ is the divalent radical of an aromatic diamine which is substituted in both ortho-positions to at least one nitrogen atom by alkyl, cycloalkyl, alkoxy, alkoxyalkyl or aralkyl, or wherein two adjacent carbon atoms of the aromatic radical are linked (substituted) by alkylene, and $X_2$ is a divalent radical of an organic diamine, which radical is different from $X_1$.

Homo- and copolyimides of the above type are described in European patent publication No. 0 132 221 A1.

The structural units of formula XVII are preferably present in an amount of 20 to 100 mol%, in particular 50 to 100 mol%, most preferably 80 to 100 mol%, and the structural units of formula XVIII are preferably present in an amount of 80 to 0 mol%, in particular 50 to 0 mol%, most preferably 20 to 0 mol%. The individual radicals Z, Z', $X_1$ and $X_2$ in the different polymer molecules may differ in meaning from one another, i.e. different structural units of the formulae XVII and/or XVIII may be present in the chain.

Z and Z' in formulae XVII and XVIII respectively are preferably the radical of pyromellitic dianhydride, a radical of formula XIV or a mixture of these radicals. Particularly preferred meanings of Z and/or Z' are the radical of pyromellitic dianhydride or of a benzophenonetetracarboxylic dianhydride or mixtures of these radicals.

Alkyl and alkoxy substituents of aromatic radicals $X_1$ may be linear or branched and contain for example 1 to 20, preferably 1 to 6 and most preferably 1 to 4, carbon atoms. Alkoxyalkyl substituents may also be linear or branched and preferably contain 2 to 12, most preferably 2 to 6, carbon atoms. Alkenyl substituents preferably contain 3 or 4 carbon atoms; cycloalkyl substituents preferably contain 5 to 8, most preferably 5 or 6, ring carbon atoms; and aralkyl substituents preferably contain 7 to 12 carbon atoms. Preferred alkoxyalkyl is ethoxymethyl and preferred aralkyl is benzyl.

In accordance with the definitions, examples of substituents of aromatic radicals $X_1$ are: methyl, ethyl, propyl, isopropyl, n-butyl, isobutyl, tert-butyl, pentyl, hexyl, octyl, dodecyl, tetradecyl, eicosyl, cyclopentyl, cyclohexyl, methylcyclohexyl, methoxy, ethoxy, propoxy, butoxy, pentoxy, hexoyloxy, methoxymethyl, methoxyethyl, ethoxymethyl, propoxymethyl, butoxymethyl, benzyl, methylbenzyl and phenylethyl. Preferred radicals are methoxymethyl, ethoxymethyl, methyl, ethyl, isopropyl, trimethylene and tetramethylene, with isopropyl and ethyl being particularly preferred and methyl being most preferred.

$X_1$ as a substituted aromatic radical may contain 8 to 30, preferably 8 to 25, carbon atoms. The aromatic radical is preferably a pyridine radical, in particular a hydrocarbon radical or, most preferably, a divalent mono- or binuclear phenyl radical which, in accordance with the definitions, is substituted by alkyl, alkoxyalkyl, alkoxy, trimethylene or tetramethylene. The aromatic radical $X_1$ may also contain further substituents, e.g. halogen such as chlorine or bromine. In a preferred subgroup, as mononuclear radicals the aromatic radicals are phenylene radicals and as binuclear radicals they are naphthylene or biphenyl radicals.

A preferred subgroup comprises polyimides in which $X_1$ in formula XVII as an aromatic radical is of the formula (10), (11) and/or (12)

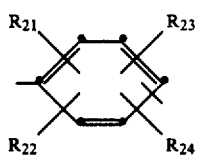
(10)

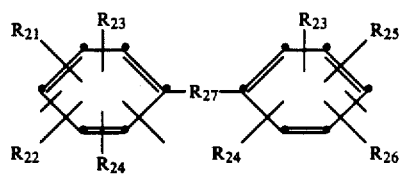
(11)

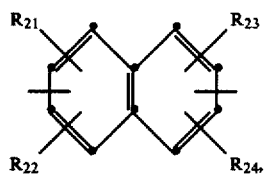
(12)

in which formula (10) the free bonds are in the m- or p-position to each other; and in which formula (11) the free bonds are preferably in the m- or p-position to the $R_{27}$ group, and $R_{21}$ and $R_{22}$, and $R_{25}$ and $R_{26}$, are bonded in the two o-positions to the free bonds. In formula (12) the free bonds are preferably bonded in the 2-, 3-, 6- and 7-positions, and $R_{21}$ and $R_{22}$, and $R_{23}$ and $R_{24}$, are in the two o-positions to the free bonds.

$R_{21}$ and $R_{22}$ are $C_1$-$C_{12}$alkyl, $C_1$-$C_{12}$alkoxy, $C_2$-$C_{12}$alkoxyalkyl, cyclopentyl, cyclohexyl or benzyl, or $R_{21}$ and $R_{23}$ in formula (10) or (11) are bonded in the adjacent position to each other and together are trimethylene or tetramethylene, and $R_{22}$ may also be a hydrogen atom, $R_{23}$ and $R_{24}$ are hydrogen atoms or, independently of each other, they have the meanings of $R_{21}$ and $R_{22}$, or $R_{23}$ and $R_{25}$ in formula (11) are bonded in the adjacent position to each other and together are trimethylene or tetramethylene. $R_{27}$ is a direct bond, —O—, —S—, —SS—, —SO—, —SO$_2$—, —CO—, —COO—, —NH—,

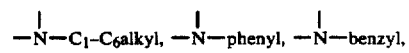

—CONH—, —CON-$C_1$-$C_6$alkyl, —CON-phenyl, —CON-benzyl,

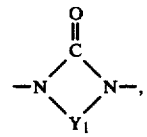

wherein $Y_1$ is

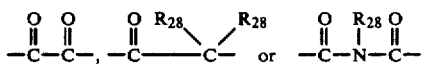

and $R_{28}$ is a hydrogen atom, $C_1$-$C_6$alkyl or phenyl; linear or branched $C_1$-$C_3$alkylene; $C_2$-$C_{12}$alkylidene which is unsubstituted or substituted by chlorine or fluorine; cycloalkylidene containing 5 or 6 ring carbon atoms; phenylene, phenylenedioxy or the group

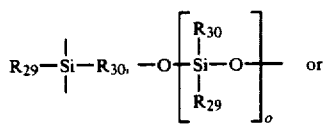

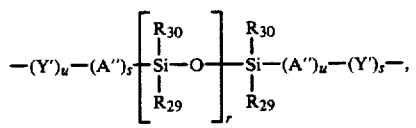

in which formulae R$_{29}$ and R$_{30}$ are C$_1$-C$_6$alkyl, C$_1$-C$_6$alkoxy, phenyl, benzyl, phenyloxy or benzyloxy, r is a value from 1 to 10, each of u and s independently of the other is 0 or 1, Y' is —O— or —S—, A" is C$_1$-C$_6$alkylene and o is a value from 1 to 100.

R$_{21}$ and R$_{22}$ are preferably C$_1$-C$_6$alkyl, most preferably methyl, ethyl, n-propyl and isopropyl. The free bonds in formula (11) are preferably in the m-position, most preferably in the p-position, to the group R$_{21}$ or R$_{25}$. Alkyl in the radicals R$_{27}$ may be e.g. methyl, ethyl, n-propyl, isopropyl, n-butyl or n-pentyl. R$_{27}$ as alkylene is preferably ethylene and most preferably methylene. R$_{27}$ as alkylidene preferably contains 2 to 6 carbon atoms, e.g. ethylidene, 2,2-butylidene, 2,2- or 3,3-pentylidiene, hexafluoropropylidene and, most preferably, 2,2-propylidene. R$_{27}$ as cycloalkylidene may be e.g. cyclopentylidene or, preferably, cyclohexylidene. The group R$_{27}$ is preferably the direct bond, —O—, —S—, —SO$_2$, —CO—, C$_1$-C$_3$alkylene or C$_2$-C$_4$alkylidene, with the direct bond and —O— being particularly preferred meanings of R$_{27}$ and —CO— or —CH$_2$— being most preferred meanings. R$_{29}$ and R$_{30}$ are preferably C$_1$-C$_4$alkyl, in particular methyl, or phenyl. Y' is preferably —O— and A" is preferably methylene or ethylene. o is preferably a value from 1 to 10 and r is preferably a value from 1 to 20, most preferably from 1 to 10.

Particularly preferred polyimides are those in which X$_1$ in formula XVII is a radical of formula (13), (14), (15) or (16)

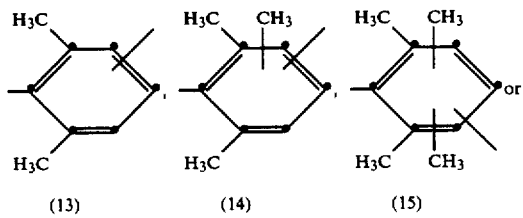

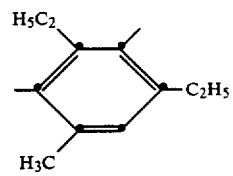

in which formulae the free bonds are in the m- or p-position to each other, or is a radical of formula (17)

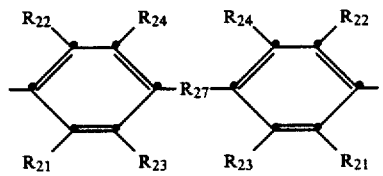

wherein each of R$_{21}$ and R$_{22}$ independently of the other is methyl, ethyl, n-propyl or isopropyl and R$_{23}$ and R$_{24}$ are hydrogen atoms or they have the meaning of R$_{21}$, or R$_{21}$ and R$_{23}$ together are trimethylene or tetramethylene and R$_{22}$ and R$_{24}$ are hydogen atoms and R$_{27}$ is a direct bond, —CH$_2$—, 2,2-propylidene or —CO—. Preferred binuclear radicals of the formula (17) are in particular those wherein R$_{21}$, R$_{22}$, R$_{23}$ and R$_{24}$ are methyl. Copolyimides containing at least two different radicals of these formulae are likewise preferred.

Copolyimides according to the definitions contain at least two different structural units, with the number of the different structural units essentially being dependent on the desired properties and on the field of application. The copolyimides preferably contain 2 to 4 different structural units.

X$_2$ may have the same meaning as X. Examples of cycloaliphatic radicals X or X$_2$ are: cyclopentylene, 1,2-, 1,3- or 1,4-cyclohexylene, methylcyclopentylene, methyl- or dimethylcyclohexylene, 3,3'- or 4,4'-biscyclohexylene, 3,4'-dimethyl-4,4'-biscyclohexylene, 4,4'-biscyclohexylene ether, sulfone, methane or -2,2-propane, with 1,4- or 1,3-cyclohexylene being particularly preferred.

Examples of araliphatic (alkylaromatic) radicals X or X$_2$ are: m- or p-benzylene, 3-methyl-4-benzylene, 3-ethyl-p-benzylene, 3,5-dimethyl-p-benzylene, 3,5-diethyl-p-benzylene, 3-methyl-5-ethyl-p-benzylene.

The above homo- and copolyimides generally have average molecular weights (number average $\overline{M}_n$) of at least 2000, preferably of at least 5000. The upper limit depends essentially on properties which determine the processability, e.g. the solubility of the homo- or copolyimides. The upper limit may be 200000, preferably 50000, and is most preferably in the range from 15000 to 20000.

3. Homo- and copolyimides which have an average molecular weight of at least 2000 and which contain at least 5 mol%, based on the polymer, of at least one structural unit of the formula XIX or XX

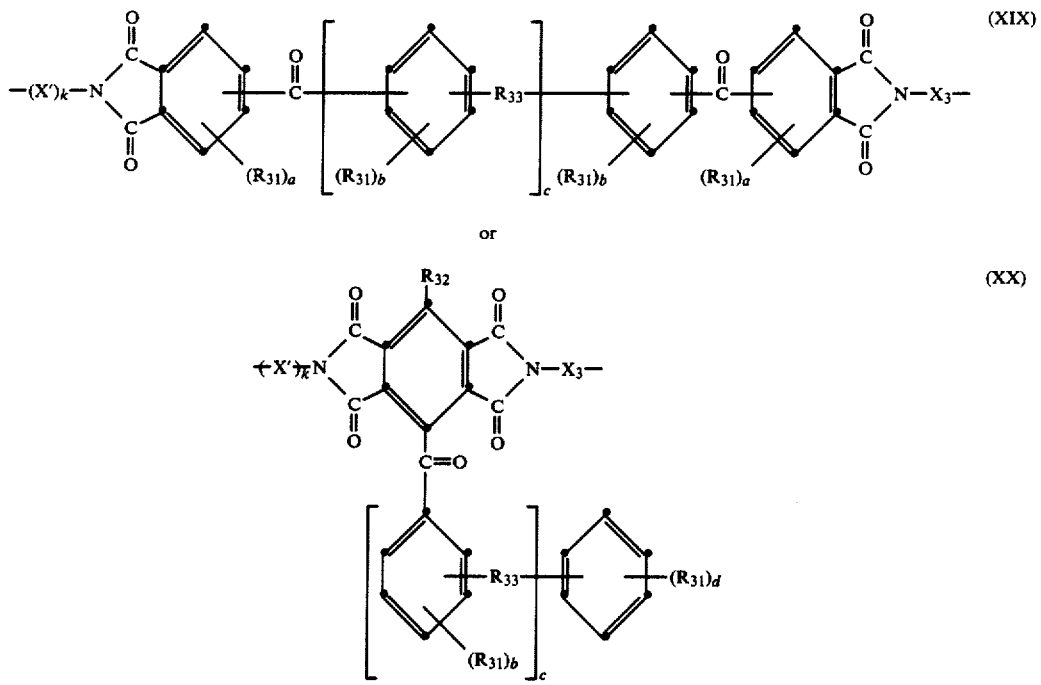

in which formulae
- $R_{31}$ is halogen, nitro or $C_1$-$C_6$alkyl, $C_1$-$C_6$alkoxy or $C_1$-$C_6$alkylthio, each of which may be substituted by phenyl, or is phenyl, phenoxy or phenylthio,
- $R_{32}$ is a hydrogen atom or aroyl or has the same meaning as $R_{31}$,
- $R_{33}$ is a direct bond or a bridge group,
- a is 0, 1, 2 or 3, b is 0, 1, 2, 3, or 4, c and d are 0, 1, 2, 3, 4, or 5, k is 0 or 1, or, if a, b and d are 2, both substituents $R_{31}$ are bonded in the o-position and together are —CH=CH—CH=CH—, and
- $X_3$ and X' are unsubstituted or substituted divalent aliphatic radicals, unsubstituted or substituted cycloaliphatic or araliphatic radicals, aromatic radicals in which two aryl nuclei are linked through an aliphatic group, or $X_3$ and X' are aromatic radicals which are substituted by at least one alkyl group, cycloalkyl group, alkoxy group, alkoxyalkyl group or aralkyl group, or wherein two adjacent carbon atoms of the aromatic radical are substituted by an alkylene group, $X_3$ being a radical corresponding to $X_1$ (formula XVII) if k is 0.

The above polymers preferably have average molecular weights (number average) of at least 5000. The upper limit depends essentially on properties which determine the processability, e.g. the solubility of the polymers. The upper limit may be 500000, preferably 100000, and is most preferably 60000.

$R_{31}$ as halogen is preferably fluorine or chlorine. Examples of $R_{31}$ as alkyl, alkoxy and alkythio are methyl, n-propyl, isopropyl, n-butyl, n-pentyl, n-hexyl, methoxy, ethxoy, n-propoxy, methylthio, ethylthio and benzylthio.

In the above formulae, a, b and d are preferably 1 and most preferably 0 and c is preferably 1 or 2 and most preferably 0.

The bridge group $R_{33}$ may be for example —O—, —S—, —SO—, —SO$_2$—, —CO—, —NR$^a$—, linear or branched $C_1$-$C_{10}$alkylene which may be substituted by fluorine or chlorine, or $R_{33}$ may be —CO$_2$—, —CONR$^a$—,

$C_2$-$C_6$alkylidene which may be substituted by fluorine or chlorine, or cycloalkylidene containing 5 or 6 ring carbon atoms, or +O—$C_yH_{2y}$O—, wherein y is 2 to 4 and v is 1 to 4, or

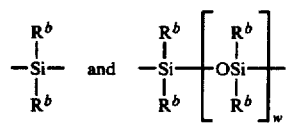

wherein v is 1 to 4. $R^a$ may be $C_1$-$C_6$-alkyl, phenyl, benzyl or cyclohexyl.

Further bridge groups are for example —N=N— and $$-\underset{\underset{R^b}{|}}{\overset{\overset{R^b}{|}}{Si}}- \quad \text{and} \quad -\underset{\underset{R^b}{|}}{\overset{\overset{R^b}{|}}{Si}}-\left[O\underset{\underset{R^b}{|}}{\overset{\overset{R^b}{|}}{Si}}\right]_w$$

wherein $R^b$ is $C_1$-$C_6$alkyl, preferably methyl, phenyl or benzyl, and w is a value from 1 to 10.

$R_{33}$ is preferably a direct bond, —O—, —S—, —CH$_2$—, ethylidene, 2,2-propylidene or, most preferably, —CO—

$R_{32}$ as aroyl is preferably benzoyl. Preferably, $R_{32}$ is a hydrogen atom.

The carbonyl groups in formula XIX are preferably in the m-position to the carbonyl groups of the imide group. If c is 0, the carbonyl groups are also preferably in the m-position to one another. The $R_{33}$ group may also be in the p-position, preferably in the m-position, to the carbonyl groups.

Preferred structural units are of formulae XIXa and XXa

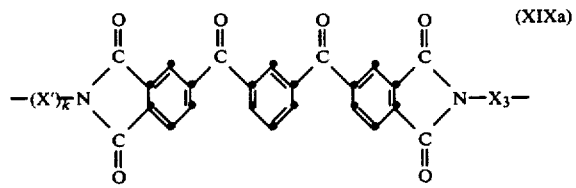

(XIXa)

and

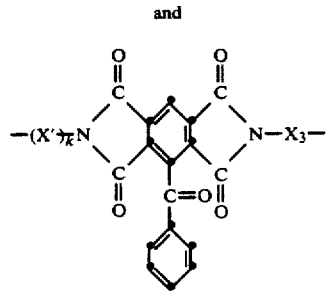

(XXa)

in which formulae k, $X_3$ and X' are as defined above. Examples of radicals X' and $X_3$ are indicated above under X, $X_1$ or $X_2$.

4. Homo- or copolyimides containing recurring structural units of formula XXI

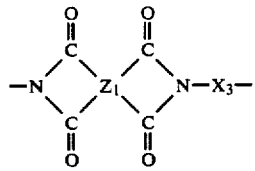

(XXII)

wherein the imide group is bonded to two adjacent carbon atoms, e is 0 or a value from 1 to 4 and f is 0 or a value from 1 to 3, $R_{34}$ is alkyl or alkoxy, each containing less than 6 carbon atoms, or $C_6$-$C_{10}$aryl, $C_7$-$C_{10}$aralkyl or halogen, and $X_4$ is an unsubstituted or substituted divalent aliphatic or aromatic hydrocarbon radical.

The structural units of formula XXI are preferably present in the copolyimides in an amount of at least 10 mol%, with an amount of at least 50 mol% being particularly preferred. Such homo- or copolyimides are described in European patent publication No. 0 138 768 A1.

Preferably, e and f are 1, most preferably 0. $R_{34}$ is preferably $C_1$-$C_4$alkyl or $C_1$-$C_4$alkoxy, with methyl, ethyl and methoxy being preferred, or halogen, with bromine or chlorine being preferred.

The carbonyl group in the structural units of formula XXI is preferably bonded in the meta-position, most preferably in the para-position, to the carbonyl bridge group, and the imide group is preferably bonded in the ortho-/meta-position, most preferably in the meta-/para-position, to the carbonyl bridge group.

$X_4$ as a divalent aliphatic radical preferably contains 2 to 30 carbon atoms, most preferably 2 to 12 carbon atoms. Suitable aromatic radicals $X_4$ are those of the type indicated above under X, $X_1$ and $X_2$.

5. Homo- and copolyimides comprising at least one aromatic tetracarboxylic acid and at least one diamine, which homo- and copolyimides essentially contain 0.1 to 100 mol% of at least one structural unit of formula XXII

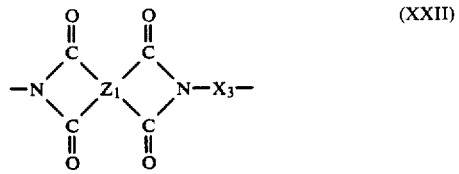

(XXII)

and 99.9 to 0 mol% of at least one structural unit of formula XVIII, in which formula XXII $Z_1$ is at least one tetravalent radical of the formula XXIII, XXIV, XXV or XXVI

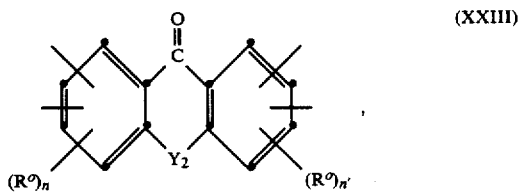

(XXIII)

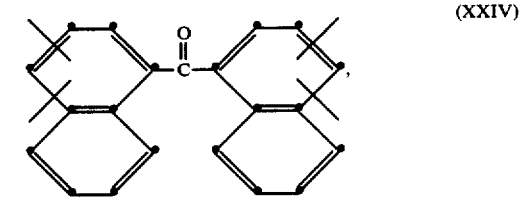

(XXIV)

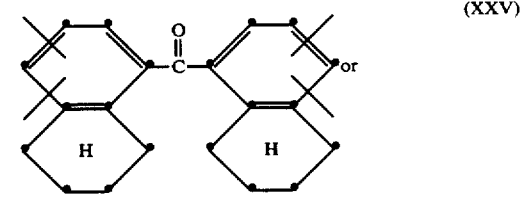

(XXV)

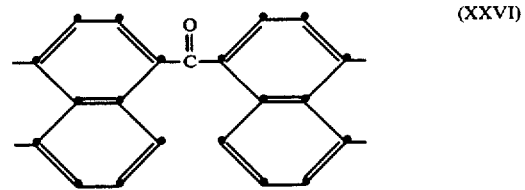

(XXVI)

in which formulae the free bonds are bonded in the ortho-position to one another and $Y_2$ is a direct bond, —$CH_2$—, —$(CH_2)_2$—, —O—, —S—, —SO—, —$SO_2$—, —CO—, —$NR_{35}$— or —$CR_{35}R_{36}$—, $R_{35}$ being a hydrogen atom, $C_1$-$C_{10}$alkyl, phenyl, naphthyl or phenyl($C_gH_{2g}$)—, in which g is 1 to 4, and $R_{36}$ having the meaning of $R_{35}$ with the exception of a hydrogen atom, $R^o$ is $C_1$-$C_{10}$alkyl, halogen, —CN, —$NO_2$, $C_1$-$C_{12}$alkoxy, phenoxy, naphthyloxy or phenyl($C_gH_{2g}$)—, in which g is 1 to 4, n' is 0, 1 or 2, and $X_3$ is as defined above.

The structural units of formula XXII are preferably present in an amount of 5 to 100 mol%, in particular 30 to 100 mol%, most particularly 60 to 100 mol% and most preferably 80 to 100 mol%, and the structural elements of formula XVIII are preferably present in an amount of 95 to 0 mol%, in particular 70 to 0 mol%, more particularly 40 to 0 mol% and most preferably 20 to 0 mol%.

The free bonds in the radicals of formulae XXIII to XXV are preferably in the meta- and para-positions to the CO group.

$R^o$ as alkyl or alkoxy may be linear or branched and preferably contains 1 to 4 carbon atoms, e.g. methyl, methoxy, ethyl, ethoxy, n-propyl, n-propoxy, isopropyl, isopropoxy, n-butyl and n-butoxy. $R^o$ as halogen is preferably chlorine and in the —$C_gH_{2g}$— group g is preferably 1 or 2. In formula XXIII, n' is preferably 0.

$R_{35}$ and $R_{36}$ as alkyl preferably contain 1 to 4 carbon atoms and may be linear or branched, e.g. methyl, ethyl, n-propyl, isopropyl and n-butyl. In the —$C_gH_{2g}$— group g is preferably 1 or 2.

$Y_2$ in formula XXIII is preferably a direct bond, —O—, —S—, —$CH_2$— or —CO—.

6. Homo- and copolyimides which contain structural units of aromatic aminodicarboxylic acids with an inherent viscosity of at least 0.1 dl/g, measured at 25° C. in a solution of 0.5% by weight of polyimide in N-methylpyrroldione, which homo- and copolyimides contain recurring structural units of the formula XXVII

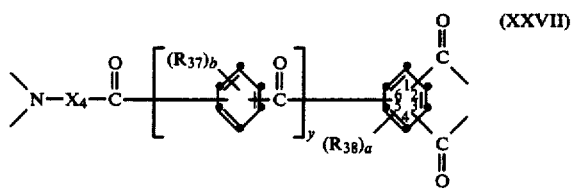

wherein
$R_{37}$ and $R_{38}$ are halogen, nitro, aryl, aryloxy, alkyl or alkoxy, b is 0 or a value from 1 to 4, a is 0 or a value from 1 to 3 and y is 0, 1 or 2, the free carbonyl groups are bonded in the ortho-position to one another and $X_4$ is a divalent aromatic radical which is substituted by at least one alkyl group or aralkyl group.

The inherent viscosity is preferably at least 0.2 dl/g, most preferably 0.2 to 2.0 dl/g. Preferably, b, a and y are 0.

$R_{37}$ and $R_{38}$ as halogen are preferably fluorine or chlorine; as aryl they are preferably phenyl; as aryloxy they are preferably phenoxy; and as alkyl and alkoxy they preferably contain 1 to 12, most preferably 1 to 4, carbon atoms, e.g. methyl, ethyl, n-propyl, isopropyl, n-butyl, methoxy and ethoxy. The carbonyl groups are preferably bonded in the 2-, 3- and 6-positions.

The aromatic radical $X_4$ is preferably substituted in at least one ortho-position, most preferably in both ortho-positions, to the nitrogen atom by alkyl or aralkyl. The preferred aralkyl substituent is benzyl. As alkyl the substituent preferably contains 1 to 12, most preferably 1 to 4, carbon atoms and may be linear or branched.

Particularly preferred alkyl substituents are ethyl, methyl, ethyl and isopropyl. Further examples of alkyl substituents are n-propyl, n-butyl, isobutyl, n-pentyl, n-hexyl, n-octyl, n-decyl and n-dodecyl.

The aromatic radical $X_4$ is preferably an alkyl-substituted phenylene radical or biphenylene radical. Most preferably, the radical $X_4$ is of formula XXVIII

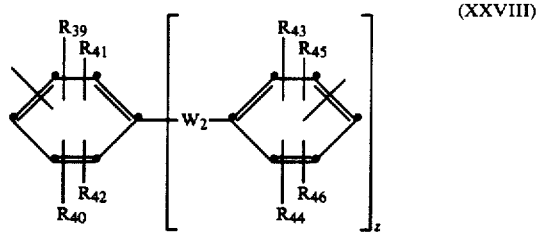

wherein z is 0 or 1, $W_2$ is a direct bond or a bridge group, $R_{39}$ is $C_1$-$C_4$alkyl and each of $R_{40}$ to $R_{46}$ independently is a hydrogen atom or $C_1$-$C_4$alkyl, and the free bonds are bonded in the meta- or para-position to the $W_2$ group.

In one embodiment, $R_{39}$ and $R_{40}$ and $R_{45}$ and $R_{46}$ are bonded in the ortho-position to the free bond and are $C_1$-$C_4$alkyl. In a particularly preferred embodiment, z in formula XXVIII is 0 and $R_{39}$ to $R_{42}$ are $C_1$-$C_4$alkyl, preferably methyl or ethyl.

The bridge group $W_2$ may have the same meaning as $W_1$. Preferably, $W_2$ is a direct bond, —S—, —O—, —SO—, —$SO_2$—, —CO—, —$CH_2$—, $C_2$-$C_6$-alkylidene, e.g. ethylidene, 1,1- or 2,2-propylidene, butylidene, cyclopentylidene or cyclohexylidene.

In a particularly preferred embodiment, the polyimides contain structural units of the formula

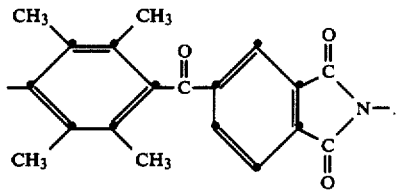

In another embodiment, the polyimides contain
(a) 0.1 to 100 mol% of structural units of formula XXVII and
(b) 99.9 to 0 mol% of structural units of formula XVIII.

7. Polyether imides of formula XXIX

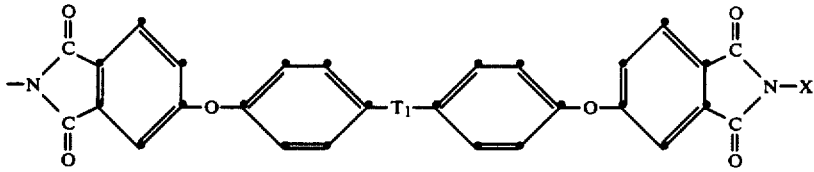

wherein $T_1$ and X are as defined above (q.v. formulae VI and XI respectively). $T_1$ is preferably —$CH_2$— and is most preferably 2,2-propylidene. X is preferably a group of formula XV and is in particular a group of formula XVa or XVb. Most preferably, X is m-phenylene.

Particularly preferred polyimides are those of types 1 and 2, with the preferences cited in the passages relating to said types 1 and 2 being applicable.

The polyimides to be employed in accordance with the invention are either known or they can be prepared by methods which are known per se by condensing corresponding acid and diamine components or aminodicarboxylic acid components in conventional manner and cyclising the resultant polyamide acids.

Suitable solvents for the polyimides to be employed in accordance with the present invention are e.g. polar solvents, in particular polar aprotic solvents, or mixtures thereof, for example ethers such as dibutyl ether, tetrahydrofuran, dioxane, methyl ethylene glycol, dimethyl ethylene glycol, dimethyl diethylene glycol, diethyl diethylene glycol, dimethyl triethylene glycol; halogenated hydrocarbons such as methylene chloride, chloroform, 1,2-dichloroethane, 1,1,2-trichloroethane, 1,1,2,2-tetrachloroethane; carboxylates and lactones, e.g. ethyl acetate, methyl propionate, ethyl benzoate, 2-methoxyethyl acetate, γ-butyrolactone, δ-valerolactone and pivalolactone; carboxamides and lactams, e.g. formamide, acetamide, N-methylformamide, N,N-dimethylformamide, N,N-diethylformamide, N,N-dimethylacetamide, N,N-diethylacetamide, γ-butyrolactam, ε-caprolactam, N-methylpyrrolidone, N-acetylpyrrolidone, N-methylcaprolactam, tetramethylurea, hexamethylphosphoric amide; sulfoxides such as dimethyl sulfoxide; sulfones such as dimethylsulfone, diethylsulfone, trimethylsulfone, tetramethylenesulfone; primary, secondary and tertiary amines such as methylamine, ethylamine, propylamine, pyrrolidone, piperidine, morpholine, dimethylamine, diethylamine, methylethylamine, trimethylamine, triethylamine, N-methylpyrrolidine, N-methylpiperidine, N-methylmorpholine; substituted benzenes such as chlorobenzene, nitrobenzene or cresol.

When heated, the components (A) (resin) and (B) and (C) (hardeners) yield crosslinked products. In general, the reaction is carried out in the temperature range from 50° to 300° C., preferably from 100° to 250° C. The quantitative ratios are conveniently selected such that for each C═C double bond of the polyimide (A) 0.4 to 1.2, preferably 0.8 to 1.0, phenolic OH groups are present in component (B) and/or (C). Curing may also be effected in the presence of catalysts or accelerators. Examples of suitable catalysts and accelerators are the compounds of the type indicated above in connection with the adduct preparation, and also urea derivatives such as N-4-chlorophenyl-N,N'-dimethylurea (monuron) and N-3-chloro-4-methylphenyl-N,N'-dimethylurea (chlortoluron). However, in general, the addition of curing catalysts and accelerators can be dispensed with.

If mixtures comprising components (A), (B) and (D) or mixtures comprising components (A), (B), (C) and (D) are employed, in general, first the components (B) and (D), or components (B), (C) and (D), are mixed or homogenised at elevated temperature, e.g. in the range from 120° C. to 200° C. The polyimide (A) is added subsequently, and curing is effected as indicated above.

The polyimides (D) are preferably employed in amounts of 2 to 20 parts by weight, most preferably 3 to 12 parts by weight, based on 100 parts by weight of the resin/hardener mixture.

Mixtures comprising components (A), (B) and (C) are preferred; and those mixtures comprising components (A), (B), (C) and (D) are most preferred. With regard to preferred components (A), (B), (C) and (D) in said mixtures, what has been stated above is applicable.

The mixtures of the invention may also contain further customary additoves, e.g. plasticisers, extenders, fillers and reinforcing agents, for example textile fibres, glass fibres, asbestos fibres, boron fibres and carbon fibres, mineral silicates, metal powders, e.g. aluminium powder or iron powder, and also pigments and dyes such as carbon black, oxide pigments and titanium dioxide, flame retardants, thixotropic agents, flow control agents, tackifiers, antioxidants and light stabilisers.

The mixtures of the invention can be prepared in a manner known per se by mixing and heating the components to moderately elevated temperatures, said components generally going into solution. However, components (B), (C) and/or (D) may first be melted and then dissolved in a suitable solvent of the above-described type, component (A) being subsequently added to the resultant solution.

The mixtures of the invention have a wide range of utilities, e.g. as laminating resins or electro-resins, as adhesives or adhesive films for application at high temperatures, or for the preparation of coatings. The mixtures of the invention are employed in particular for the preparation of carbon fibre- and glass fibre-reinforced composite materials, especially for the preparation thereof from unidirectional prepregs or preimpregnated rovings, e.g. in aircraft construction, for missiles and in engine construction, e.g. for the preparation of casings and piston rods, or for the preparation of laminates (prepregs), in particular for printed circuits. A suitable processing aid for the preparation of ribbons and webs is e.g. the addition of phthalates and cyanates, in particular di-n-butyl phthalate, di-n-octyl phthalate, diallyl phthalate or triallyl cyanurate or mixtures thereof, conveniently in amount of 1 to 20, preferably 4 to 10, parts by weight, based on 100 parts by weight of components (A)+(B).

A characteristic feature of the mixtures of the invention is their good processability, in particular in the preparation of adhesive films, prepregs and composite materials. Since the soluble polyimides (D) are very compatible with the resin/hardener mixture, they do not precipitate during processing. The cured products obtained with the mixtures of the invention are distinguished by improved properties, in particular by good mechanical and thermal properties such as increased flexural strength and edge elongation, high glass transition temperatures and, especially, a high fracture toughness.

The invention is illustrated in more detail by the following Examples.

EXAMPLE 1

26.8 g (0.087 mol) of 2,2-bis(4-hydroxy-3,5-diallylphenyl)propane are mixed with 7.2 g of a bis(4-hydroxyphenyl)methane diglycidyl ether [bisphenol F dilglycidyl ether] which has an epoxide equivalent weight of 165 (corresponding to 0.25 equivalent of epoxide groups per equivalent of phenolic OH) and heated together with 0.2% of 2-phenylimidazole for 30 minutes to 150° C. The mixture, containing the epoxide group-free adduct of 2,2-bis(4-hydroxy-3,5-diallylphenyl)propane with the bisphenol F diglycidyl ether and also containing 13.4 g of unreacted 2,2-bis(4-hydroxy-3,5-diallylphenyl)propane, is subsequently thoroughly mixed at 150° C. with 35.8 g (0.1 mol) of N,N'-4,4'-diphenylmethane-bismaleimide. The mixture thus obtained is degased for 15 minutes at 5 bar and then poured into forms of 80×60×4 cm. Curing is then effected for 1 hour at 180° C., for 2 hours at 200° C. and for 6 hours at 250° C. The flexural strength and edge elongation of these test samples is determined.

A portion of the incompletely cured mixture is used for measuring the gelling time and a further portion is used for determining the fracture toughness (FT) by the double torsion test following the procedure described by P. W. R. Beaumont and J. R. Young in "Journal of Materials Science" 10, 1334 (1975), and 11, 776 (1979). To determine the fracture toughness, two aluminium plates [Extrudal 050, manufactured by the company Alusuisse, containing 0.5% by weight of AlMgSi (dimensions: 200×20×5 mm)] which have been treated with chromosulfuric acid are cemented with the curable mixture, and the bond is cured, under the conditions described above, under slight pressure. In this procedure, the crack propagation in the bond is determined, i.e. the breaking energy in $J/M^2$ is calculated from the maximum load for the crack propagation in the bond. The following results are obtained:

| | |
|---|---|
| gelling time at 160° C. | 18 minutes |
| flexural strength acc. to ISO 178 (immediately after curing) | 173 MPa |
| flexural strength acc. to ISO 178 (after 30 days at 180° C. in air) | 167 MPa |
| edge elongation acc. to ISO 178 (immediately after curing) | 6.4% |
| edge elongation acc. to ISO 178 (after 30 days at 180° C. in air) | 5.1% |
| fracture toughness | 121 $J/m^2$ |

EXAMPLES 2 TO 5

3.75 g of each of the polyimides I to IV obtained from 1,1,3-trimethyl-3-p-aminophenyl-5(6)-aminoindan and 3,3',4,4'-benzophenonetetracarboxylic dianhydride and having the average molecular weights (determined by gel permeation chromatography (GPC) and Stauder indices R indicated below [prepared in accordance with U.S. Pat. No. 3,856,752] are added to 26.8 g (0.087 mol) of 2,2-bis(4-hydroxy-3,5-diallylphenyl)propane, and each batch is thoroughly mixed at 180° C. After the addition of 35.8 g (0.1 mol) of N,N',4,4'-diphenylmethane-bismaleimide, each of the resultant mixtures is then processed in accordance with the procedure described in Example 1 [weight ratio polyimide:resin/hardener mixture=6:100]. Unless otherwise stated, the cured products are tested in accordance with the procedure described in Example 1. The glass transition temperature is determined from the maximum rate of penetration of a stressed punch by the thermo-mechanical analysis method described by R. Schmid and M. Fischer in "Progress Advanced Materials and Processes", Montreux, 1984.

The following polyimides are employed:

| | Staudinger Index R | average molecular weight $\overline{M}_n$ |
|---|---|---|
| polyimide I | 0.63 | 18000 |
| polyimide II | 0.84 | not determined |
| polyimide III | 0.91 | 27500 |
| polyimide IV | 1.13 | not determined |

The test results are summarised in the Table I below.

TABLE I

| Example | 2 Polyimide I | 3 Polyimide II | 4 Polyimide III | 5 Polyimide IV |
|---|---|---|---|---|
| Tg °C. | 304 | 309 | 304 | 310 |
| flexural strength MPa | 161 | 155 | 162 | 153 |
| edge elongation % | 5.3 | 4.8 | 5.2 | 4.7 |
| fracture toughness $J/m^2$ | 170 | 122 | 222 | 178 |

EXAMPLES 6 TO 8

2.1 g of each of the following polyimides V to VII are added to 26.8 g (0.087 mol) of 2,2-bis(4-hydroxy-3,5-diallylphenyl)propane, and each batch is thoroughly mixed at 180° C.: polyimide V obtained from 3,3'-dimethyl-5,5'-diethyl-4,4'-diaminodiphenylmethane (component (A)) and pyromellitic dianhydride, polyimide VI obtained form 0.7 mol of component (A) and 0.3 mol of 2,6-diethyl-4-methyl-m-phenyldiamine (component (B)) and 1 mol of pyromellitic dianhydride, polyimide VII obtained from 0.4 mol of component (A) and 0.6 mol of component (B) and 1 mol of pyromellitic dianhydride, each prepared in accordance with European patent publication No. 0 132 221 A1.

After the addition of 35.8 g (0.1 mol) of N,N',4,4'-diphenylmethanebismaleimide, each mixture is processed as indicated in Example 1 [weight ratio polyimide:resin/hardener = 3:100]. The products obtained are also tested as described in Example 1. The results are summarised in Table II.

TABLE II

| Example | 6 Polyimide V | 7 Polyimide VI | 8 Polyimide VII |
|---|---|---|---|
| Tg °C. | 329 | 326 | 326 |
| flexural strength MPa | 146 | 163 | 149 |
| edge elongation % | 4.7 | 5.3 | 4.6 |
| fracture toughness $J/m^2$ | 171 | * | 158 |

*not determined because of adhesion failure

EXAMPLE 9

26.8 g (0.087 mol) of 2,2-bis(4-hydroxy-3,5-diallylphenyl)propane are mixed at 180° C. with 7.5 g of polyimide I (q.v. Example 2). After a homogeneous solution has been obtained, 35.8 g of N,N',4,4'-diphenylmethanebismaleimide are added (corresponding to about 12.7 parts by weight of polyimide I per 100 parts by weight of the resin/hardener mixture), and the resultant mixture is processed and cured as described in Example 1. The fracture toughness is determined as being 354 $J/m^2$. If 30 parts by weight of polyimide I are employed per 100 parts by weight of resin/hardener mixture, a fracture toughness of 322 $J/m^2$ is obtained.

EXAMPLE 10

26.8 g (0.087 mol) of 2,2-bis(4-hydroxy-3,5-diallylphenyl)propane are melted at 180° C. with 7.5 g of polyimide I, the melt obtained is dissolved in 66.3 ccm of methylene chloride (approx. 50% solution), and 35.8 g (0.1 mol) of N,N',4,4'-diphenylmethane-bismaleimide are then added. Carbon fibre hanks made of carbon fibres of the type T 400, manufactured by the company Toray, are impregnated with the resultant solution, and a unidirectional prepreg is prepared in a drum take-up, the solvent being evaporated off by means of an infrared radiator. The prepreg is processed to a unidirectional laminate of 2 mm thickness, which is then cured as in Example 1. The following properties of the laminate (65% by weight of carbon fibres) are determined:

| flexural strength across the fibre (test sample 80 × 15 × 4) | 88 MPa |
|---|---|
| flexural strength parallel to the fibre | 1700 MPa |

EXAMPLE 11

A further unidirectional carbon fibre laminate is prepared in accordance with the procedure of Example 10. However, before the addition of the polyimide, the 26.8 g of 2,2-bis(hydroxy-3,5-diallylphenol)propane are pre-reacted for 30 minutes at 150° C. with 7.2 g of a bis(4-hydroxyphenyl)methane diylcidyl ether which has an epoxide equivalent of 165 (corresponding to 0.25 equivalent of epoxide groups per equivalent of phenolic OH). In addition to containing the epoxide-free adduct, the resultant mixture also contains about 13.4 g of unreacted 2,2-bis(4-hydroxy-3,5-diallylphenol)propane. Further processing is as described in Example 10. The following properties of the laminate (62% by weight of carbon fibres) are determined:

| flexural strength across the fibre | 92 MPa |
|---|---|
| flexural strength in the direction of the fibre | 2010 MPa |
| interlaminary shear strength acc. to. ANSI 2344-76 | 119 MPa |
| interlaminary shear strength after 60 days in motor oil at 170° C. | 63 MPa |

EXAMPLES 12 TO 15

Further moulded articles are prepared and tested as follows:

EXAMPLE 12

The procedure of Example 1 is repeated using 24.4 g (0.087 mol) of bis(4-hydroxy-3,5-diallylphenyl)methane instead of 26.8 g of 2,2-bis(4-hydroxy-3,5-diallylphenyl)propane. The resultant mixture contains about 12.2 g of unreacted bis(4-hydroxy-3,5-diallylphenyl)methane.

EXAMPLE 13

The procedure of Example 2 is repeated using 24.4 g (0.087 mol) of bis(4-hydroxy-3,5-diallylphenyl)methane instead of 26.8 g of 2,2-bis(4-hydroxy-3,5-diallylphenyl)propane and using 4.0 g of polyimide I (6 parts by weight per 100 parts by weight of resin/hardener).

EXAMPLE 14

The procedure of Example 1 is repeated using an equivalent amount (9.4 g) of a 2,2-bis(4-hydroxyphenyl)propane diglycidyl ether (bisphenol A diglycidyl ether) which has an epoxide weight of 187 instead of the 7.2 g of bisphenol F diglycidyl ether.

EXAMPLE 15

The procedure of Example 1 is repeated using an equivalent amount (20.7 g) of a 2,2-bis(4-hydroxyphenyl)propane diglycidyl ether which has an epoxide weight of 400 instead of the 7.2 g of bisphenol F diglycidyl ether.

The test results are summarised in Table III.

TABLE III

| Example | 12 | 13 | 14 | 15 |
|---|---|---|---|---|
| flexural strength MPa | 136 | 144 | 148 | 122 |
| edge elongation % | 3.3 | 4.1 | 4.4 | 2.8 |

EXAMPLE 16

26.8 g (0.087 mol) of 2,2-bis(4-hydroxy-3,5-diallylphenyl)propane, 3.2 g (about 5.1%) of dibutyl phthalate and 35.8 g of N,N',4,4'-diphenylmethane-bismaleimide are thoroughly mixed at about 150° C. After cooling, the mixture is dissolved in a solution of 500 g of methylene chloride and 7.9 g of polyimide I (about 12 parts by weight of polyimide per 100 parts by weight of resin/hardener). A 6K roving C-300 fibre (manufactured by the company Toray) is impregnated with the resultant solution. While evaporating the solvent off, the impregnated roving is wound onto a spool. The impregnated roving is very pliable. With brief heating, the roving is wound onto a preheated (about 120° C.) mandrel (diameter: 40 mm; wall strength: 1 mm). Curing is effected as in Example 1.

EXAMPLE 17

35.2 g (0.09 mol) of the adduct of Example 1 are heated to 150° C. and mixed with 2.46 g (0.1 mol) of diallyl phthalate and 3.7 g of di-n-octyl phthalate (5% by weight). Subsequently, at the same temperature, 35.8 g (0.1 mol) of the bismaleimide as employed in Example 1 are dissolved in the batch. Processing and curing are effected as described in Example 1. The following properties are measured:

| $T_g$ | 350° C. |
|---|---|
| flexural strength acc. to ISO 178 | 143 MPa |
| edge elongation acc. to ISO 178 | 4.6% |

The cooled resin mixture is softly elastic at room temperature.

EXAMPLE 18

26.64 g (0.8 mol) of 2,2-bis(4-hydroxy-3,5-diallylphenyl)propane, such as employed in Examples 6 to 8, are mixed with 3.69 g (0.15 mol) of diallyl phthalate and heated to 150° C. 3.85 g (6% by weight) of polyimide I and 35.8 g (0.1 mol) of the bismaleimide as employed in Example 1 are then dissolved in the resultant solution. Processing and curing are as in Example 1. The following properties are measured:

| $T_g$ | 330° C. |
|---|---|
| flexural strength acc. to ISO 178 | 160 MPa |
| edge elongation acc. to ISO 178 | 4.6% |
| fracture toughness | 188 J/m$^2$ |

At room temperature, the mixture is softly elastic and slightly adhesive; it is therefore very suitable for the preparation of prepregs.

EXAMPLE 19

Preparation of o-allylphenol-terminated adducts of 2,2-bis(4-allyloxyphenyl)propane with diglycidyl ethers of 2,2-bis(4-hydroxyphenyl)propane or of bis(4-hydroxyphenyl)methane (A) A flask equipped with stirrer, thermometer and nitrogen gas flow inlet is charged with 1232 g (4 mol) of 2,2-bis(4-allyloxyphenyl)propane [diallyl ether of bisphenol A]. 312.4 g of a bis(4-hydroxyphenyl)methane diglycidyl ether which has an epoxide content of 5.90 equivalents/kg are then added, and the mixture is stirred under nitrogen at 80° C. until a homogeneous solution is obtained. A small sample is taken in order to determine the epoxide content. An initial epoxide content of 1.17 equivalents/kg is measured. 0.12 g of 2-phenylimidazole, as catalyst, [100 ppm, based on the 2,2-bis(4-allyloxyphenyl)propane] are added. The mixture is heated, with stirring, to 190° C. and then kept for 5 hours at 180° C., the epoxide content of the adduct which is formed dropping to below 1.0 equivalent/kg. The resultant adduct is a brown resinuous liquid with a viscosity at 100° C. of 194 MPa.s and an average molecular weight of 650 (number average, determined by gel permeation chromatography).

(B) The above procedure is repeated using 100 g of 2,2-bis(4-allyloxyphenyl)propane, 31.2 g of 2,2-bis(4-hydroxyphenyl)propane diglycidyl ether which has an epoxide content of 5.13 equivalents/kg and 0.01 g of 2-phenylimidazole. The product is a resinuous liquid which has an epoxide content of less than 0.1 equivalent/kg and an average molecular weight of 880 (number average, determined by gel permeation chromatography).

The epoxide contents and the average molecular weights are determined by the methods published in J. Appl. Polym. Sci., 19 (1975) 585–600 (H. Batzer, S. A. Zahir).

EXAMPLE 20

(a) A resin mixture is prepared in accordance with the procedure of Example 18. From said resin mixture a carbon fibre prepreg is then prepared with a 6 K roving C-300 (Toray) by the melting process. The prepreg is flexible at room temperature and has a good tack. A laminate (unidirectional) prepared from the prepreg and cured by the procedure described in Example 1 has the following properties:

| fibre content | 59.5% |
| --- | --- |
| flexural strength (2 mm plate) parallel to the fibre | 1955 MPa |
| flexural strength across the fibre | 110 MPa |
| interlaminary shear strength | 126 MPa |
| tensile strength across the fibre | 55 MPa |

(b) A laminate plate is prepared with the carbon fibre T 400 (Toray) following the procedure of Example 20a. The laminate has an interlaminary shear strength of 119 MPa.

(c) A 35% solution of the resin components of Example 18 in methylene chloride is prepared, and a 6K roving C-300 is impregnated with it. The impregnated roving is dried in a stream of air and then briefly heated to about 130° C. in order to remove the solvent residues. After cooling, the roving is wound onto a mandril. The roving is very flexible and can be processed to a tube (inner diameter=40 mm) by the winding process.

What is claimed is:

1. A storage-stable heat-curable mixture consisting essentially of (A) a polyimide which contains in the molecule at least two radicals of formula I

wherein D is a divalent radical with a C=C double bond, (B) an alkenylphenol, and at least one of (C) an epoxide group-free adduct of an epoxy resin with excess alkenylphenol or (D) a polyimide other than polyimide (A) which is soluble in organic solvents.

2. A mixture according to claim 1, wherein the polyimide (A) is a compound of formula II

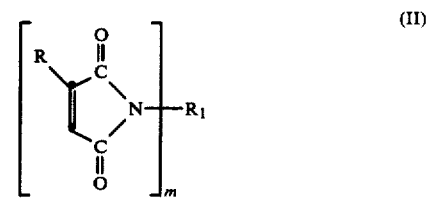

wherein m is 2 or 3, R is a hydrogen atom or a methyl group and $R_1$ is an m-valent organic radical containing 2 to 30 carbon atoms.

3. A mixture according to claim 2, wherein m is 2, R is a hydrogen atom, $R_1$ is —$(CH_2)_p$—, in which p is 2 to 12, or is m- or p-phenylene, m- or p-xylylene, 1,4-cyclohexylene, 1,4-bis(methylene)cyclohexylene, the radical of 4,4'-biscyclohexylmethane or a radical of formula IVa

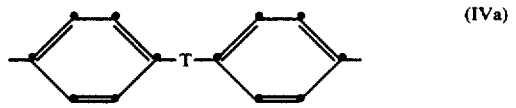

wherein T is —O—, —$CH_2$— or —$SO_2$—.

4. A mixture according to claim 1, wherein the polyimide (A) is N,N',4,4'-diphenylmethane-bismaleimide.

5. A mixture according to claim 1, wherein the component (B) is a compound of formula VI or VIII

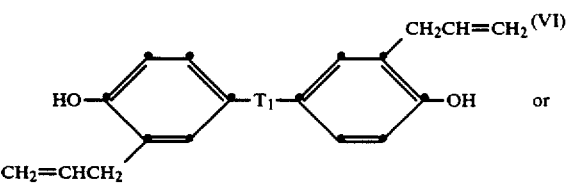

-continued

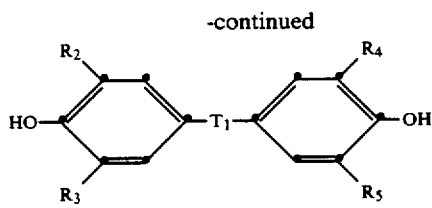 (VIII)

in which formulae T₁ is the direct bond, methylene, 2,2-propylidene, —O—, —S—, —SO— or —SO₂— and each of R₂, R₃, R₄ and R₅ independently is a hydrogen atom, an allyl or propenyl group, with at least one of R₂ to R₅ being the propenyl group.

6. A mixture according to claim 5, wherein the component (B) is a compound of formula VI in which T₁ is 2,2-propylidene or methylene.

7. A mixture according to claim 1, wherein the adduct (C) is derived from an epoxy resin containing on average more than one group of formula X

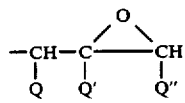 (X)

wherein each of Q and Q″ is a hydrogen atom and Q′ is a hydrogen atom or a methyl group or Q and Q″ together are —CH₂CH₂— or —CH₂CH₂CH₂— and Q′ is a hydrogen atom, which group of formula II is attached to a sulfur, oxygen or nitrogen atom.

8. A mixture according to claim 1, wherein the component (C) is an adduct of an excess of a compound of formula VI

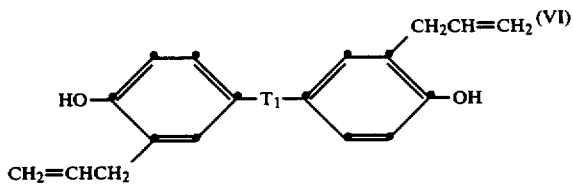 (VI)

or an alkenyl ether of a phenol, with a diglycidyl ether or advanced diglycidyl ether of 2,2-bis(4-hydroxyphenyl)propane, of 2,2-bis(3,5-dibromo-4-hydroxyphenyl)propane, of bis(4-hydroxyphenyl)methane, of bis(4-hydroxycyclohexyl)methane or of 2,2-bis(4-hydroxycyclohexyl)-propane, or with a polyglycidyl ether of a novolak or with tetraglycidylated 4,4′-diaminodiphenylmethane.

9. A mixture according to claim 8, wherein the adduct (C) is an adduct of a compound of formula VI, in which T₁ is 2,2-propylidene or methylene, with a diglycidyl ether or an advanced diglycidyl ether of bisphenol A, tetrabromobisphenol A or bisphenol F.

10. A mixture according to claim 1, wherein the component (D) is a polyimide which essentially consists of recurring structural units of formula XI

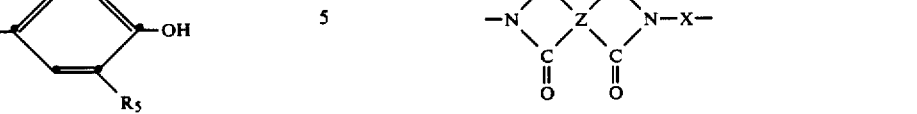 (XI)

wherein the four carbonyl groups are linked to different carbon atoms and each pair of carbonyl groups is in the ortho- or para-position to the other, Z is a tetravalent radical which contains at least one aromatic ring and X is a divalent aromatic, aliphatic, alkylaromatic, cycloaliphatic or heterocyclic radical or a radical which contains O-, S-, N-, Si- or P-containing bridge numbers, with the proviso that (1) of the total number of recurring polyimide units (A) in 0 to 100 mol% of such units, Z is a phenylindan radical of the structural formula XII

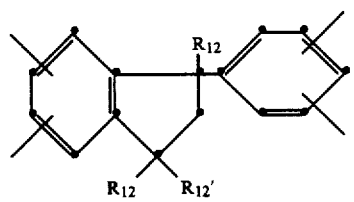 (XII)

wherein R₁₂ is hydrogen or a C₁-C₅alkyl radical and R₁₂′ is a C₁-C₅alkyl radical, and (B) in 0 to 100 mol% of such units, X is a phenylindan radical of the structural formula XIII

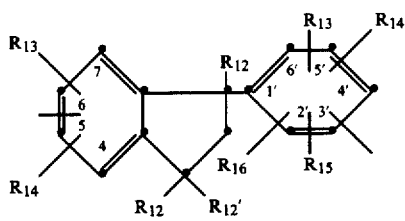 (XIII)

wherein R₁₂ is hydrogen or a C₁-C₅alkyl radical and R₁₂′ is a C₁-C₅alkyl radical and each of R₁₃, R₁₄, R₁₅ and R₁₆ independently is hydrogen, halogen, C₁-C₄alkoxy or a C₁-C₄alkyl radical and (2) of the total number of radicals Z and X at least 10 mol%, based on the individual components, are phenylindan radicals.

11. A mixture according to claim 10, wherein Z in formula XI is a radical of formula XII, the radical of pyromellitic dianhydride, a radical of formula XIV

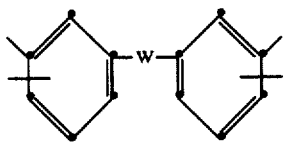 (XIV)

or a mixture of these radicals, W in formula XIV being the direct bond, —CH₂—, —O—, —SO₂— or —CO—.

12. A mixture according to claim 10, wherein X in formula XI is a group of formula XVa or XVb

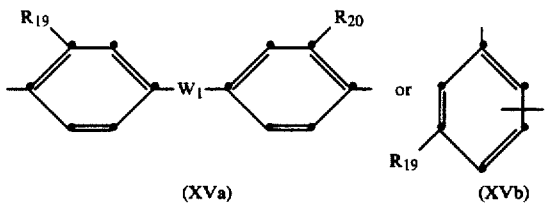 (XVa)   (XVb)

in which formulae $W_1$ is a covalent bond, methylene, ethylidene, 2,2-propylidene, cyclohexylidene, —S—, —O— or —$SO_2$— and each of $R_{19}$ and $R_{20}$ independently of the other is hydrogen, halogen, $C_1$-$C_5$alkyl or $C_1$-$C_5$alkoxy, with hydrogen or methyl being preferred.

13. A mixture according to claim 12, wherein, in the structural units of formula XI, 0 to 100 mol% of the radicals Z are of the formula

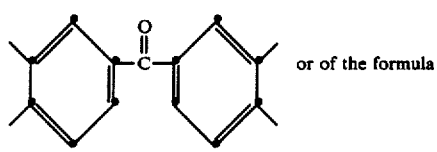 or of the formula

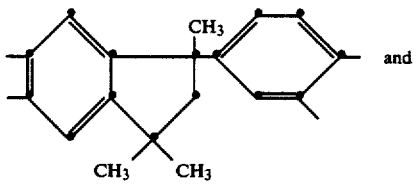

and 100 to 0 mol% of the radicals Z are a mixture of radicals of the formulae

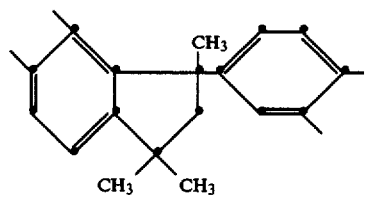

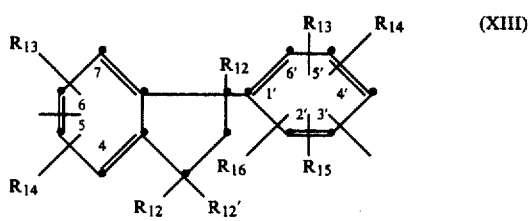

and 100 to 10 mol% of the radicals X are those of formula XIII

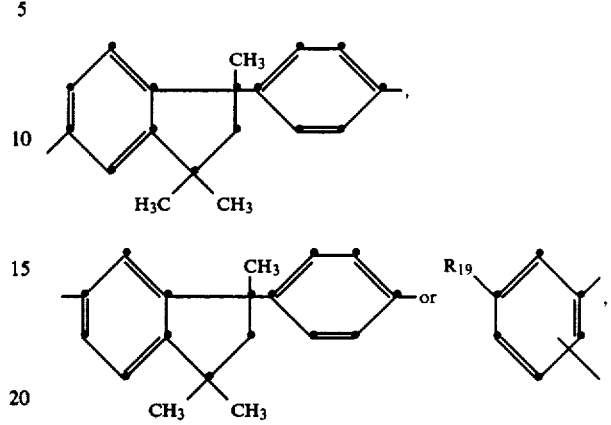 (XIII)

wherein each of $R_{12}$, $R_{13}$, $R_{14}$, $R_{15}$ and $R_{16}$ independently is hydrogen or methyl and $R_{12}'$ is methyl, and 0 to 90 mol% of the radicals X are of the formula XVa or XVb as indicated in claim 12.

14. A mixture according to claim 10, wherein, in the structural units of formula XI, X is

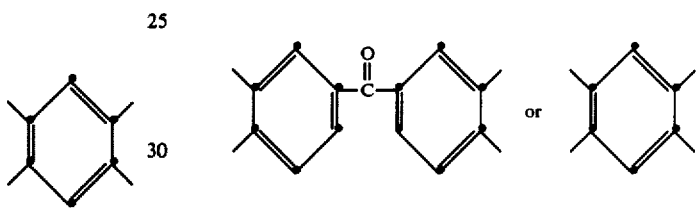

wherein $R_{19}$ is hydrogen or methyl, or a mixture thereof, and Z is

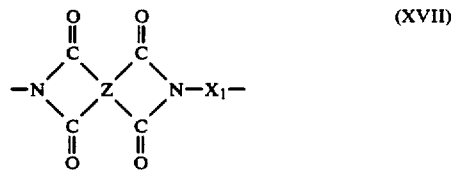

or a mixture thereof, the proportion of the phenylindan units in the diamine components preferably being 70 to 100 mol%.

15. A mixture according to claim 1, wherein the component (D) is a homo- or copolyimide comprising at least one aromatic tetracarboxylic acid and at least one aromatic diamine, which homo- or copolyimide essentially consists of 5 to 100 mol% of at least one structural unit of formula XVII

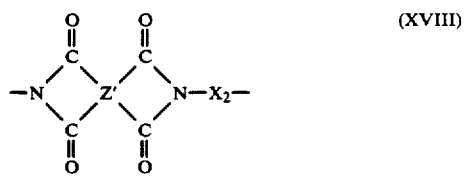 (XVII)

and 95 to 0 mol% of at least one structural unit of formula XVIII

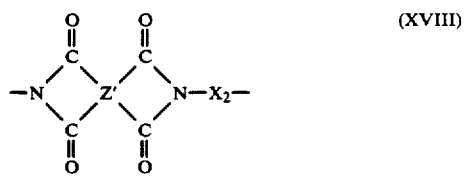 (XVIII)

in which formulae the four carbonyl groups are linked to different carbon atoms and each pair of carbonyl groups is in the ortho- or peri-position to the other, Z is a tetravalent radical containing at least one aromatic ring, Z' has the same meaning as Z or is a tetravalent radical different from Z, $X_1$ is the divalent radical of an aromatic diamine which is substituted in both ortho-positions to at least one nitrogen atom by alkyl, cycloalkyl, alkoxy, alkoxyalkyl or aralkyl, or wherein two adjacent carbon atoms of the aromatic radical are linked (substituted) by alkylene, and $X_2$ is a divalent radical of an organic diamine, which radical is different from $X_1$.

16. A mixture according to claim 15, wherein the structural units of formula XVII are present in an amount of 20 to 100 mol%, in particular 50 to 100 mol%, and the structural units of formula XVIII are present in an amount of 80 to 0 mol%, in particular 50 to 0 mol%.

17. A mixture according to claim 15, wherein $X_1$ in formula XVII is a radical of formula (13), (14), (15) or (16)

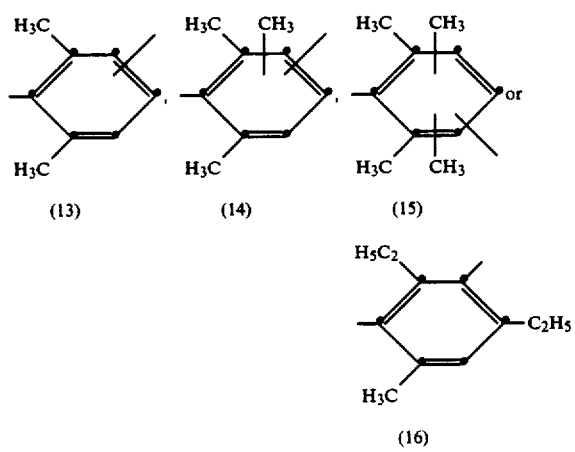

in which formulae the free bonds are in the m- or p-position to each other, or is a radical of formula (17)

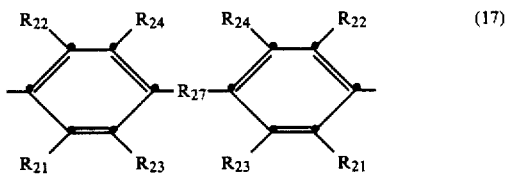

wherein each of $R_{21}$ and $R_{22}$ independently of the other is methyl, ethyl, n-propyl or isopropyl and $R_{23}$ and $R_{24}$ are hydrogen atoms or they have the meaning of $R_{21}$, or $R_{21}$ and $R_{23}$ together are trimethylene or tetramethylene and $R_{22}$ and $R_{24}$ are hydrogen atoms and $R_{27}$ is a direct bond, —$CH_2$—, 2,2-propylidene or —CO—.

18. A mixture according to claim 17, wherein $R_{21}$, $R_{22}$, $R_{23}$ and $R_{24}$ in formula (17) are methyl.

19. A mixture according to claim 15, wherein Z or Z' is the radical of pyromellitic dianhydride, a radical of formula XIV

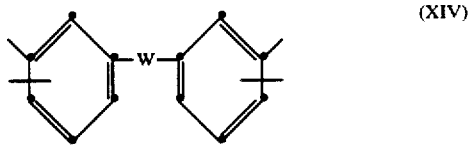

or a mixture of these radicals, W in formula XIV being the direct bond, —$CH_2$—, —O—, —$SO_2$— or —CO—.

20. A mixture according to claim 15, wherein Z and/or Z' are the radical of pyromellitic dianhydride or of a benzophenonetetracarboxylic acid dianhydride or a mixture of these radicals.

* * * * *